Nov. 24, 1964 W. A. ELSASSER 3,157,949
SEGMENTED ARCH WIRE BRACKET
Filed Nov. 13, 1961
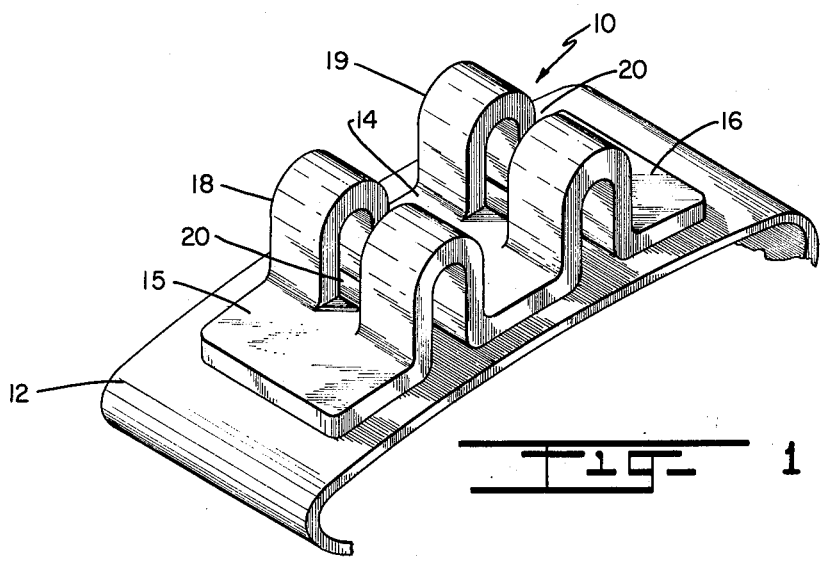
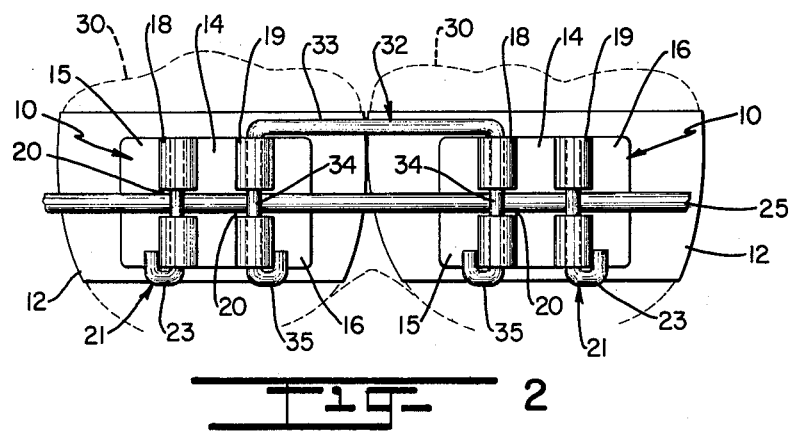
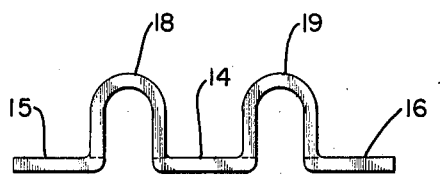
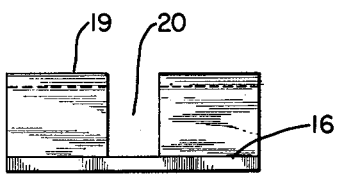
INVENTOR.
WILLIAM A. ELSASSER
BY
*Philip H. Sheridan*
ATTORNEY 3,157,949
SEGMENTED ARCH WIRE BRACKET
William A. Elsasser, 511 El Cerrito Plaza,
El Cerrito, Calif.
Filed Nov. 13, 1961, Ser. No. 151,738
2 Claims. (Cl. 32—14)

This invention relates to a new and useful orthodontic bracket having particular utility in cooperation with a connecting member for the treatment of two or more teeth at once.

It is a principal and foremost object of the present invention to provide for an orthodontic bracket which is so constructed and arranged as to enable secure and accurate placement of an arch wire in desired relation to the teeth, and further, to enable anchoring of two or more teeth together without affecting the arch wire connection.

It is another object to provide for the combined use of special connecting means in association with a series of brackets formed in accordance with this invention, for the correctional treatment and anchoring of two or more teeth together while retaining an arch wire in desired relation to the teeth.

It is a further object to make provision for a new, improved orthodontic bracket construction which is economical to produce, compact and sturdy in construction, and can be easily and securely attached to a tooth.

The above and other objects, advantages and features of this invention will become more readily understood from the following detailed description taken together with the accompanying drawing, in which:

FIGURE 1 is an enlarged perspective view of a preferred form of orthodontic bracket, in accordance with the present invention;

FIGURE 2 is a view in elevation illustrating the combined use of a pair of brackets to establish interconnected relation between a pair of teeth;

FIGURE 3 is a plan view of the bracket shown in FIGURE 1; and

FIGURE 4 is a side view of the preferred form of bracket shown in FIGURE 1.

Referring in detail to the drawing, FIGURE 1 illustrates a preferred form of bracket 10 in connected relation to a tooth band 12. Conventionally, the tooth band 12, or other suitable form of support, is designed to encircle the tooth in order to properly position the bracket in relation to the tooth.

From a consideration of FIGURES 1, 3 and 4 the bracket 10 is generally W-shaped in cross section and is completely symmetrical about either a horizontal or vertical axis passed therethrough. In construction, the bracket consists of a flat intermediate flange 14 and side flanges 15 and 16. The intermediate flange 14 is separated from each of the side flanges 15 and 16 by outwardly projecting channels 18 and 19, each channel being generally U-shaped in cross section and each having an open horizontal slotted portion 20 therein. The slots 20 extend the complete depth of the channels to terminate at the surfaces of the flanges and are also horizontally aligned with one another to form a common arch wire receiving area.

The flanges, due to their spacing and relatively large combined area, provide a good base for firm attachment of the bracket to the tooth band, either by weld or other suitable means. In connected relation to a tooth, as in FIGURE 2, each channel in turn defines a vertical pin-receiving opening for accommodating a conventional arch wire locking pin 21, the channels having either a square or rectangular cross section depending upon the cross-sectional configuration of the pin employed. In order to hold an arch wire 25 in the slotted areas 20 of the channels, a pin 21 is shown inserted in one of the channels of each bracket in FIGURE 2. Each pin is suitably formed with an enlarged end, not shown, which seats against the top surface of the channel, and a lower end 23 is bent and doubled back upon itself so that the pin is locked in place. Of course, other arch wire retaining means may be employed in place of the pins, such as, ligature or tie wires to prevent outward movement or accidental release of the arch wire.

As a primary feature of the present invention, a pair of the brackets 10 can be employed in a unique way to anchor two or more teeth together in a greatly simplified manner, as shown in FIGURE 2. Here, the brackets are shown in connected relation to adjacent teeth 30, although it will be evident that the bracket connection to be described would have useful application for interconnection of a series of three or more teeth as well. Specifically, in order to anchor the teeth 30 together, a special connecting pin, in the form of a generally U-shaped wire 32, connects adjacent or near channels of the brackets. The wire includes an upper portion 33 spanning the space between channels, vertical shanks 34 for insertion in the channels, and lower ends 35 bent into locked relation against the sides of the channels. The pin 32 will effectively exert corrective forces on the teeth, through its shanks 34, and will also cooperate with the individual pins 21 to hold the arch wire 25 in place. In this relation, the pin 32 will not interfere with the free horizontal slidable movement of the arch wire 25 in the slotted areas, when such movement is desired.

Apart from the unique relationship established through use of a pair of brackets in combination with the locking pin 32, the brackets can be employed individually to apply correctional forces to a tooth. For example, the spaced disposition and alignment of the slotted areas 20 in each bracket permit the direct transfer of forces from the arch wire 25 through the sides of the slotted areas to the tooth either for axial or rotational control. Moreover, the simplified construction and arrangement of the bracket will permit use of eyelets at desired locations, for instance, to apply special correctional forces through the use of ligature wires, in a well known manner.

Most desirably the bracket is formed out of a single metal blank and easily shaped into the desired W-shaped form. Nevertheless, it is to be understood that various modifications and changes can be made in the composition, form and detailed design of the bracket without departing from the scope of this invention, as defined by the appended claims.

What is claimed is:
1. In combination, a plurality of brackets and a connecting pin for interconnecting adjacent brackets in connected relation to a pair of teeth thereby to apply correctional forces to the teeth, each bracket comprising a base portion for attachment to a tooth band, vertical connecting pin-receiving channels arranged in spaced horizontal relation on said base, said channels having aligned slotted areas accommodating an arch wire therein, each connecting pin extending between adjacent brackets and including anchoring means at each end inserted in a respective channel on adjacent brackets and locked therein retaining the arch wire in said slotted areas.

2. In combination, a pair of brackets and a connecting pin for interconnecting the brackets in connected relation to a pair of teeth thereby to apply correctional forces to the teeth, each bracket comprising a base portion for attachment to a tooth band, vertical connecting pin-receiving channels arranged in spaced horizontal relation on said base, said channels having aligned slotted areas accommodating an arch wire therein, each connecting pin being generally U-shaped and extending between adjacent channels on said brackets, said pin including a vertical shank at either end inserted through a respective channel on each bracket and locking end portions anchoring said brackets together and locking the arch wire in said slotted areas.

References Cited in the file of this patent

UNITED STATES PATENTS

| | | |
|---|---|---|
| 1,014,029 | Angle | Jan. 9, 1912 |
| 2,257,069 | Peak | Sept. 23, 1941 |
| 2,305,916 | Atkinson | Dec. 22, 1942 |
| 2,686,365 | Schurter | Aug. 17, 1954 |
| 2,716,283 | Atkinson | Aug. 30, 1955 |
| 3,043,006 | Wallshein | July 10, 1962 |

FOREIGN PATENTS

| | | |
|---|---|---|
| 189,504 | Switzerland | Feb. 28, 1937 |

OTHER REFERENCES

Rocky Mountain Summary Price List (for 1961 AAO Meeting), page 15 relied upon.